(12) United States Patent
Grundhöfer et al.

(10) Patent No.: US 10,609,365 B2
(45) Date of Patent: Mar. 31, 2020

(54) LIGHT RAY BASED CALIBRATION SYSTEM AND METHOD

(71) Applicant: Disney Enterprises, Inc., Burbank, CA (US)

(72) Inventors: Anselm Grundhöfer, Greifensee (CH); Dominik Thabo Beeler, Zurich (CH)

(73) Assignee: DISNEY ENTERPRISES, INC., Burbank, CA (US)

(*) Notice: Subject to any disclaimer, the term of this patent is extended or adjusted under 35 U.S.C. 154(b) by 603 days.

(21) Appl. No.: 15/090,887

(22) Filed: Apr. 5, 2016

(65) Prior Publication Data

US 2017/0289534 A1 Oct. 5, 2017

(51) Int. Cl.
*H04N 17/00* (2006.01)

(52) U.S. Cl.
CPC .................. *H04N 17/002* (2013.01)

(58) Field of Classification Search
CPC .................................................. H04N 17/002
USPC ....................................................... 356/239.2
See application file for complete search history.

(56) References Cited

U.S. PATENT DOCUMENTS

| | | | | |
|---|---|---|---|---|
| 4,067,638 A * | 1/1978 | Yano | | G03H 1/268 359/22 |
| 4,158,564 A * | 6/1979 | Gardiner | | G03G 15/051 399/138 |
| 5,936,774 A * | 8/1999 | Street | | G02B 5/32 359/630 |
| 6,008,484 A * | 12/1999 | Woodgate | | G02B 27/2214 250/201.1 |
| 9,363,569 B1 * | 6/2016 | van Hoff | | G06Q 30/0263 |
| 2002/0008674 A1 * | 1/2002 | Son | | G09G 3/003 345/4 |
| 2003/0099467 A1 * | 5/2003 | Inoue | | H04N 5/23248 386/264 |
| 2003/0107805 A1 * | 6/2003 | Street | | G02B 27/2214 359/464 |
| 2003/0142970 A1 * | 7/2003 | Nishida | | G03B 15/03 396/155 |
| 2004/0164673 A1 * | 8/2004 | Suzuki | | H01L 27/3211 313/506 |
| 2007/0046860 A1 * | 3/2007 | Daiku | | G02B 6/0038 349/68 |
| 2008/0144174 A1 * | 6/2008 | Lucente | | G02B 27/2214 359/463 |
| 2010/0250171 A1 * | 9/2010 | Kozu | | G01M 11/0257 702/81 |
| 2011/0026014 A1 * | 2/2011 | Mack | | G03B 13/22 356/124 |
| 2011/0176029 A1 * | 7/2011 | Boydston | | G01J 3/50 348/223.1 |

(Continued)

*Primary Examiner* — Tarifur R Chowdhury
*Assistant Examiner* — Omar H Nixon
(74) *Attorney, Agent, or Firm* — Dorsey & Whitney LLP

(57) ABSTRACT

The present disclosure relates to a system and method for calibrating an optical device, such as a camera. In one example, the system includes a light-emitting device that generates light patterns and an ray generator that is positioned between the light-emitting device and the optical device. The ray generator separates the light emitted as part of the light patterns into a plurality of directional rays. The optical device then captures the directional rays and the captured data, along with data corresponding to the light pattern and the ray generator, are used to calibrate the optical device.

20 Claims, 7 Drawing Sheets

(56) References Cited

U.S. PATENT DOCUMENTS

| | | | | |
|---|---|---|---|---|
| 2012/0293667 A1* | 11/2012 | Baba | H04N 13/246 | 348/187 |
| 2013/0182127 A1* | 7/2013 | Yasuda | H04N 5/23212 | 348/207.1 |
| 2015/0055937 A1* | 2/2015 | Van Hoff | H04N 13/243 | 386/285 |
| 2015/0058102 A1* | 2/2015 | Christensen | G11B 27/11 | 705/14.6 |
| 2015/0140832 A1* | 5/2015 | Quinn | H01L 51/56 | 438/761 |
| 2015/0363931 A1* | 12/2015 | Olczak | G06T 7/0018 | 348/175 |
| 2016/0014405 A1* | 1/2016 | Beckman | H04N 17/002 | 348/187 |
| 2016/0182903 A1* | 6/2016 | Grundhofer | G06T 7/80 | 348/187 |
| 2017/0103509 A1* | 4/2017 | Scharfenberger | H04N 9/3185 | |
| 2017/0330365 A1* | 11/2017 | Adamov | H04L 67/10 | |
| 2017/0330382 A1* | 11/2017 | Adamov | G06T 15/005 | |

* cited by examiner

LIGHT RAY BASED CALIBRATION SYSTEM AND METHOD

TECHNICAL FIELD

The technology described herein relates generally to methods and systems for calibrating optical devices.

BACKGROUND

Many applications, such as measurement systems, require that the lens properties of cameras are calibrated. Certain lens properties can affect the accuracy of images captured by a camera and can be difficult to detect. Accurate images captured by a camera can be used to calibrate other devices such as projectors, track objects, determine depth of objects, image stitching, three dimensional reconstruction, and so on. Given that the accuracy of the camera images are required in order to have accurate data entry into the other uses for the images, cameras are often required to be calibrated before use.

Conventional calibration methods are typically time intensive, cumbersome, and/or require specialized calibration hardware and software tools. One conventional calibration method requires a planar checkboard that is moved around by a user to different spatial locations around the camera. The user then captures images of the checkboard in the different locations and this information is used to determine the lens properties of the camera. While this technique can generate acceptable calibration results, it depends heavily on the experience of the user, is very time intensive, and requires a large amount of space in order to accurately calibrate the various lens properties of the camera.

SUMMARY

One example of the present disclosure relates to a system and method for calibrating an optical device, such as a camera. In one example, the system includes a light-emitting device or a light source that emits lights and an ray generator positioned between the light-emitting device and the optical device. The ray generator separates the emitted light into a plurality of directional rays. The optical device then captures the directional rays and the captured data, along with data corresponding to the emitted light and the ray generator, which are used to calibrate the optical device. The ray generator may be an masking element, such as an optical mask, one or more lenses, a diffraction grating or substantially any device that can define or create the directional rays.

Another example of the present disclosure relates generally to a method for calibrating an optical device. The method includes generating by the light-generating device a light pattern, separating by an ray generator the light pattern into a plurality of light rays, capturing one or more images by the optical device of the plurality of light rays, and determining by a processing element one or more lens properties of the optical device based on the light ray images captured by the optical device.

Yet another example of the present disclosure includes a calibration assembly for use in calibrating a camera. The calibration assembly includes an emitting device that generates light wavelengths and an ray generator in optical communication with the emitting device. In operation, the ray generator separates the light wavelengths emitted from the emitting device into one or more directional light rays.

SPECIFICATION

The present disclosure is generally related to a system and method for calibrating optical devices, such as cameras. The system simulates point patterns in space to generate hallucinations of light points, and uses the simulated points to calibrate an optical device. In one embodiment, the system includes a light-emitting device, such as an electronic visual display (e.g., liquid crystal display, plasma display, etc.) and one or more ray generators for generating directional light rays. To calibrate an optical device, different light patterns are generated by the emitting device, separated by the ray generator into directionally coded light rays, and an image of the rays is captured by the optical device. The light ray patterns generated by the emitting device, along with the known information of the ray generator, can then be used to determine different characteristics of the optical device based on the captured images.

As used herein, the term directional ray is meant to encompass directionally coded light rays.

The ray generator can be passive, such as a static opaque layer with multiple ray apertures defined in various locations across the layer. Alternatively, the ray generator can be active and dynamically generate ray apertures in different locations, such as a liquid crystal display having pixels that can be activated to pass or block light. Additionally, the ray generators can also be color specific to generate additional directional rays. For example, the ray generator may include multiple layers that allow only certain wavelengths to pass through the main body, e.g., cyan, magenta, and yellow layers can be used to partially block red, green, and blue light. In these embodiments, the ray apertures define the singular pathway for light of the blocked color. By stacking the color blocking layers, or otherwise arranging them in different orders and distances between the emitting device, the accuracy of the calibration process can be improved and can be completed faster due to the increased amount of data with each captured image. Further, in these embodiments, the camera can be calibrated on a spectral basis to account for instances where the camera lens may refract different light wavelengths differently. In these instances, the calibration process allows the lens properties to be calibrated for red, green, and blue (or different wavelengths) individually.

Figure 1:
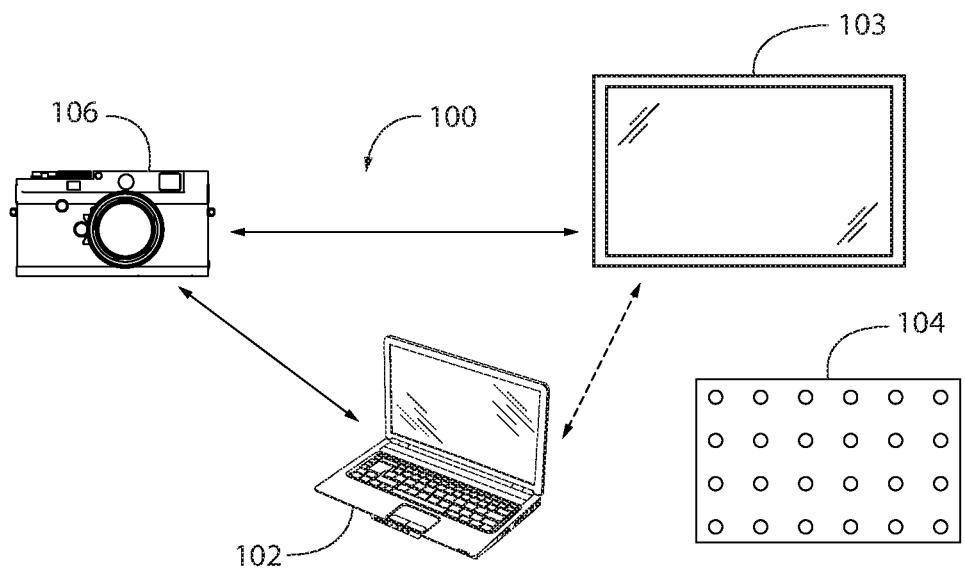
FIG. 1 is a block diagram of a calibration system.

An example of a calibration system 100 is shown in FIG. 1. With reference to FIG. 1, the calibration system 100 includes a computer 102, a light-emitting device 103 or light source, an ray generator 104, and an optical device 106. The system 100 can be used to calibrate a number of optical devices, but in one embodiment, the optical device 106 is a digital camera having a lens and an image sensor. In some embodiments, the light-emitting device 103 and ray generator 104 form the calibration assembly and data captured by the optical device 106 from use with the calibration assembly is input into the computer 102 for calibrating the optical device.

The light-emitting device 103 or light source generates incident light (e.g., light wavefront) that is captured by the optical device 106. The light-emitting device 103 or emitter can be tailored to generate and/or emit light wavelengths. In one embodiment, the light-emitting device 103 is an electronic visual display screen, such as a liquid crystal display (LCD). Other examples of emitting devices 103 include plasma displays, light-emitting diode (LED) display, organic light-emitting display, field emission display, laser display, a plurality of laser light sources, or the like. The emitting device 103 is typically configured to emit spatially controllable light and often may require a pixel density sufficient to achieve a desired calibration for the camera. For example, the higher the pixel density the more accurate the calibration, but as the pixel density is increased the pixel size may be reduced, which reduces the light emitted from each pixel, such that the calibration may take longer to get the same amount of photons as compared to larger pixels. Accordingly, the pixel density can be selected based on a tradeoff of the calibration accuracy and calibration time.

Figure 2:
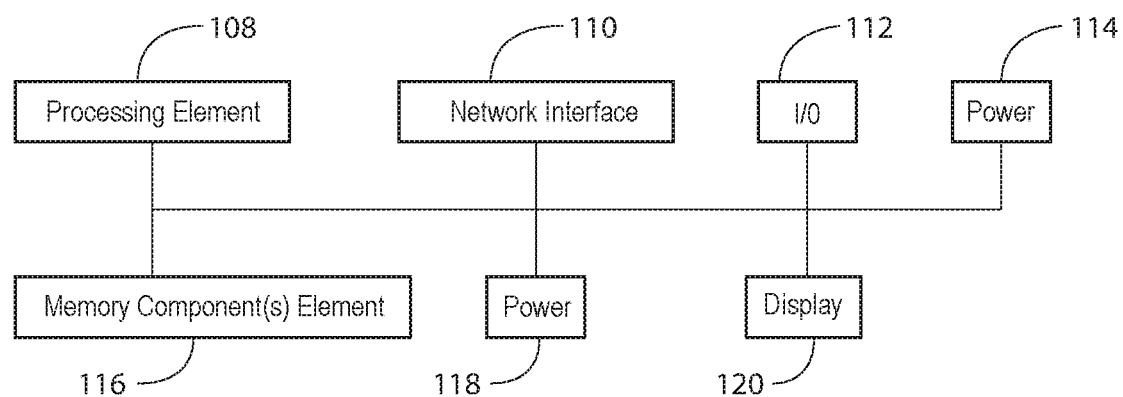
FIG. 2 is a simplified block diagram of a computer of the calibration system of FIG. 1.

The computer 102 is used to process image data from the optical device 106, as well as light ray information from the ray generator 104 and/or light-emitting device 103. FIG. 2 is simplified block diagram of the computer 102. It should be noted that although in the example of FIG. 1, only one computer 102 is shown; however, in other embodiments, more than one computer or server may be used. The computer 102 may include one or more processing elements 108, a network interface 110, a power source 114, a display 120, one or more memory components 116, and an input/output (I/O) interface 112. Each of the elements of the computer 102 may be in communication via one or more system buses, wirelessly, or the like.

The processing element 108 is any type of electronic device capable of processing, receiving, and/or transmitting instructions. For example, the processing element 108 may be a microprocessor or microcontroller. Additionally, it should be noted that select components of the computer 102 may be controlled by a first processor and other components may be controlled by a second processor, where the first and second processors may or may not be in communication with each other.

The memory 116 stores data used by the computer 102 to store instructions for the processing element 108, as well as store optimization, calibration, and other camera 106 and ray generator 104 data for the calibration system 100. For example, the memory 116 may store data or content, such as, but not limited to, audio files, video files, and so on, corresponding to various applications. The memory 116 may be, for example, magneto-optical storage, read-only memory, random access memory, erasable programmable memory, flash memory, or a combination of one or more types of memory components.

A power source 114 provides power to the components of the computer 102 and may be a battery, power cord, or other element configured to transmit power to the computer 102.

The display 120 provides visual feedback to a user and, optionally, can act as an input element to enable a user to control, manipulate, and calibrate various components of the calibration system 100. The display 120 may be similar to the light emitter 103 and be any suitable display, such as a liquid crystal display, plasma display, organic light-emitting diode display, and/or cathode ray tube display. In embodiments where the display 120 is used as an input, the display may include one or more touch or input sensors, such as capacitive touch sensors, resistive grid, or the like.

The I/O interface 112 allows a user to enter data into the computer 102, as well as provides an input/output for the computer 102 to communicate with other devices (e.g., camera 106, light-emitting display 103, ray generator 104, other computers, speakers, etc.). The I/O interface 112 can include one or more input buttons, touch pads, and so on.

The network interface 110 provides communication to and from the light-emitting device 103, the ray generator 104, and/or the camera 106, and the computer 102. The network interface 110 includes one or more communication protocols, such as, but not limited to WiFi, Ethernet, Bluetooth, and so on.

The ray generator 104 is used to generate directional or angled light rays. In some embodiments, the ray generator 104 defines an optical mask and includes a light blocking substrate that includes one or more ray apertures. In these embodiments, the light blocking aspect of the ray generator blocks, absorbs, and/or reflects the incident light. The ray apertures allow light to pass through the ray generator and may be permanently defined, such as holes cut into the material, or may be variable, such as pixels in an LCD that selectively allow light through. In the latter example, the ray apertures can be dynamically modified to vary the angle of the light rays that are transmitted therethrough. In other embodiments, the ray generator 104 may generate the rays in other manners. For example, in one embodiment, the ray generator may be a diffraction grating or a plurality of small lenses (e.g., lenslet array) that are used with a corresponding light source to generate directional rays. In the first example, the diffraction grating can be used with one or more laser light sources to create or define the directional rays.

Depending on the embodiment, the ray generator 104 may be one or more layers and is typically configured to correspond to the shape and dimensions of the emitting device 103. The ray generator 104 may be curved to further modify the ray generation or may be spaced at different distances from the emitting device 103 as discussed below. In examples where an active ray generator is used, the generator may optionally block colored wavelengths or select wavelengths, rather than all wavelengths. The ray generator 104 can be integrated with the emitting device 103 (i.e., be the same device, such as a holographic device that hallucinates virtual 3D points) or may be separate from the emitting device 103. The ray generator 104 acts as a parallax barrier device that in effect generates a holographic light pattern that can be captured by the optical device.

Figure 3:
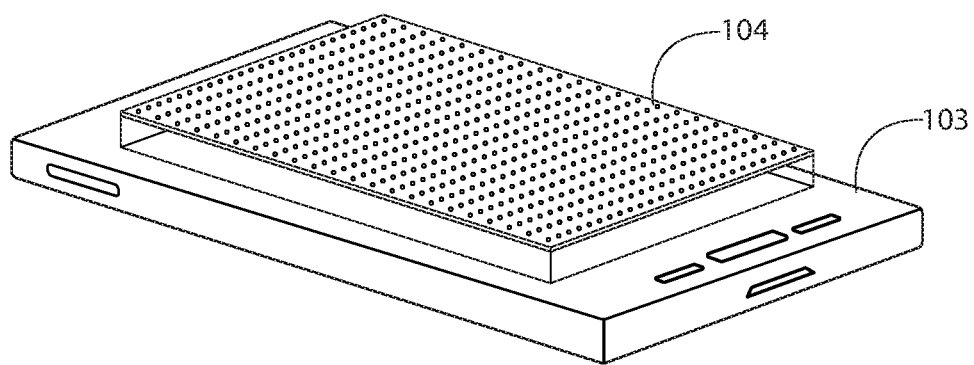
FIG. 3 is an isometric view of a first example of a calibration assembly including an emitting device and an ray generator.
Figure 4:
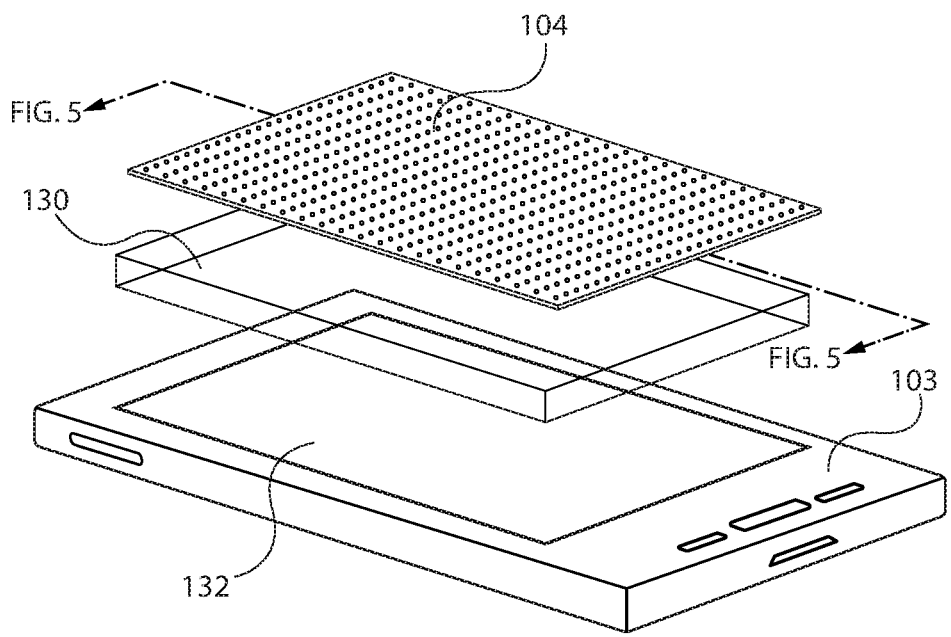
FIG. 4 is a partially exploded view of the calibration assembly of FIG. 3.
Figure 5:
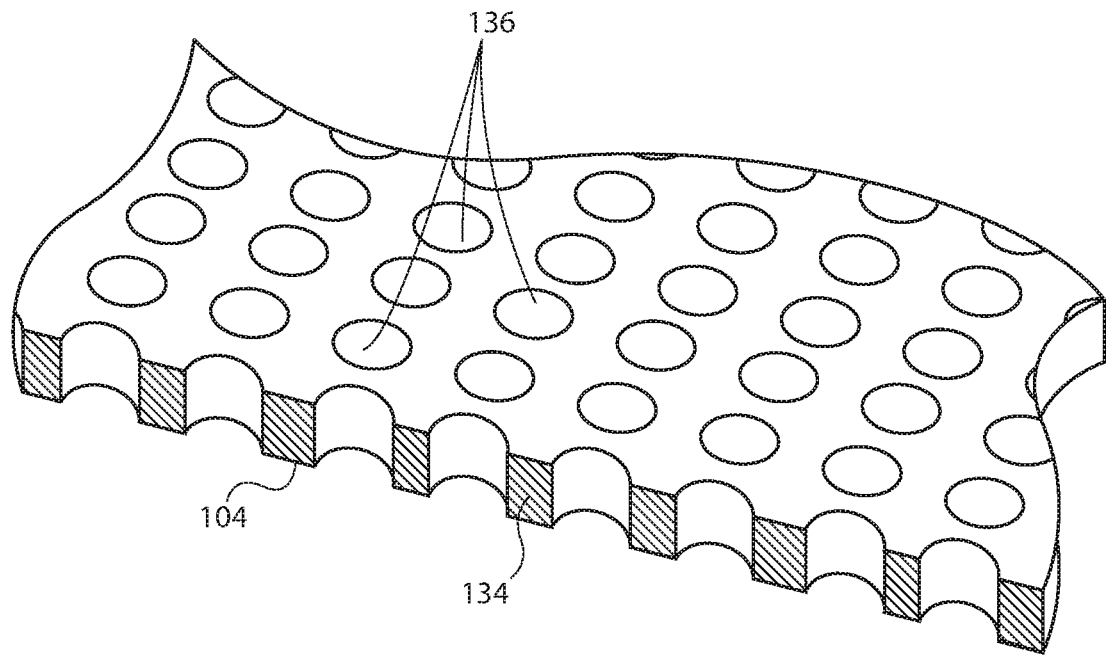
FIG. 5 is an enlarged view of the ray generator of calibration assembly of FIG. 4.

A first example of the ray generator 104 is shown in FIGS. 3-5. With reference to FIGS. 3 and 4, in this example, the ray generator 104 defines an optical mask and is a perforated plane or substrate placed directly on top of the light-emitting device 103, which in this embodiment is an LCD screen for a portable electronic device. The ray generator 104 is positioned within or formed integrally with a spacing layer 130. The spacing layer 130 sets a fixed, predetermined distance, between the light-emitting device 103 and the ray generator 104. In one embodiment, the spacing layer 130 is a clear glass or other transparent component that transmits all wavelengths therethrough. However, in other embodiments, the spacing layer 130 may form a portion of the ray generator 104 and may block select wavelengths.

The spacing layer 130 may have a width that determines the spacing distance between the ray generator 104 and the light-emitting device 103, e.g., the width of the spacing layer 130 is the spacing distance and the ray generator 104 engages the top surface of the spacing layer 130 and the light-emitting device 103 engages the bottom surface of the spacing layer 130. In other embodiments, the spacing layer 130 may be held at a predetermined distance, e.g., by spacing elements such as blocks, rubber elements, or the like. The spacing layer 130 may be selected to have the substantially the same dimensions as the light-emitting device 103 or the dimensions may be selected based on a desired light-emitting region and may block light from the emitting device 103 that falls outside of the desired region.

With reference to FIG. 5, in this embodiment, the ray generator 104 includes a blocking substrate 136 that blocks one or more light wavelengths from passing therethrough. The blocking substrate 136 may be selected to block or mask all wavelengths and be completely opaque or may allow select wavelengths to pass therethrough. A plurality of ray apertures 134 are defined throughout the blocking substrate 136 and allow light from the light-emitting device 103 and the spacing layer 130 to be transmitted therethrough. In one example, the ray apertures 134 are generated by a laser that creates the apertures through the substrate 136. The ray apertures 134 may have a consistent diameter or may have varying diameters.

The size and spatial arrangement of the ray apertures 134 may be selected based on the desired characteristics of the camera 106 to be calibrated and can be varied as desired. In one embodiment, the ray generator 104 is an infrared (IR) light pass filter and the ray apertures are less than 0.2 mm in diameter and arranged in a 3×3 mm grid. In this manner a light field display is generated when light from the emitting device is passed through the ray generator and the light rays are angled based on the location of the ray apertures.

In embodiments where the ray generator 104 is active, the substrate 134 forms an electronic display or other component and the ray apertures 136 are pixels that are selectively modified to pass through or block light. For example, the substrate may be made up of pixels with liquid crystal, and when electrically stimulated, the liquid crystal may align to block certain wavelengths. In this manner, the ray apertures 136 are dynamically variable and may not be defined as actual holes in the device, but windows that allow wavelengths to pass through.

When the light-emitting device 103 is activated, the light generated by the device 103 is transmitted through the spacing layer 130. The light waves that hit the blocking substrate 136 of the ray generator 104 are blocked and only light waves that align with the ray apertures 134 are transmitted through the ray generator 104. In this manner, the ray generator 104 generates a plurality of directional rays having a low spread. The spread or solid angle of the emitted directional light is generally desirable to be reduced in order to enhance the calibration process, but can be varied based on the device to be calibrated and the reconstruction algorithms. Some factors that influence the spread including the aperture diameter, the thickness of the optical mask, the area of the emitted light point (e.g., smaller pixels or larger pixels), diffraction of the light between the ray generator, light emitter, and/or optical device.

Figure 6:
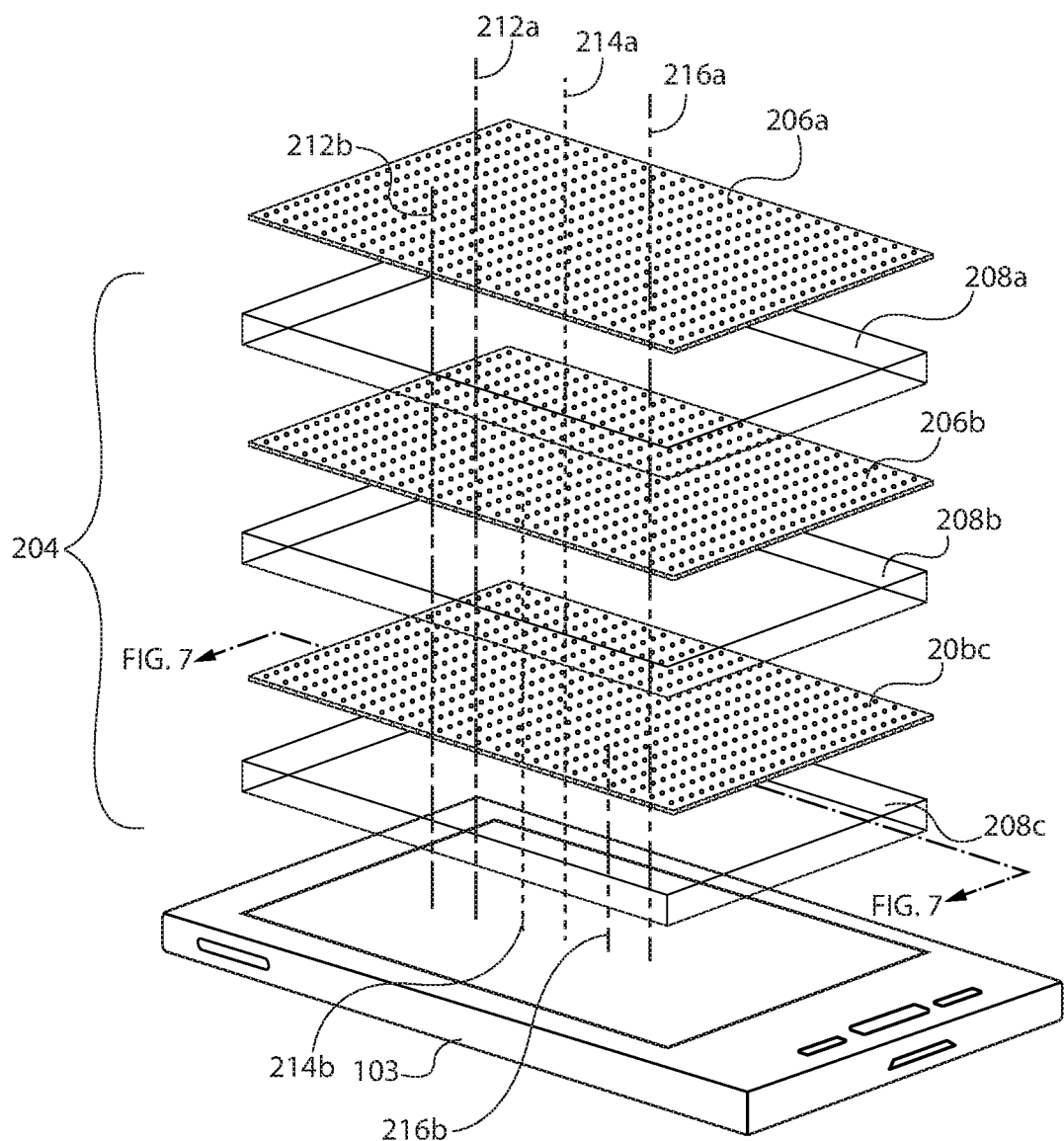
FIG. 6 is a partially exploded view of a second example of a calibration assembly.
Figure 7:
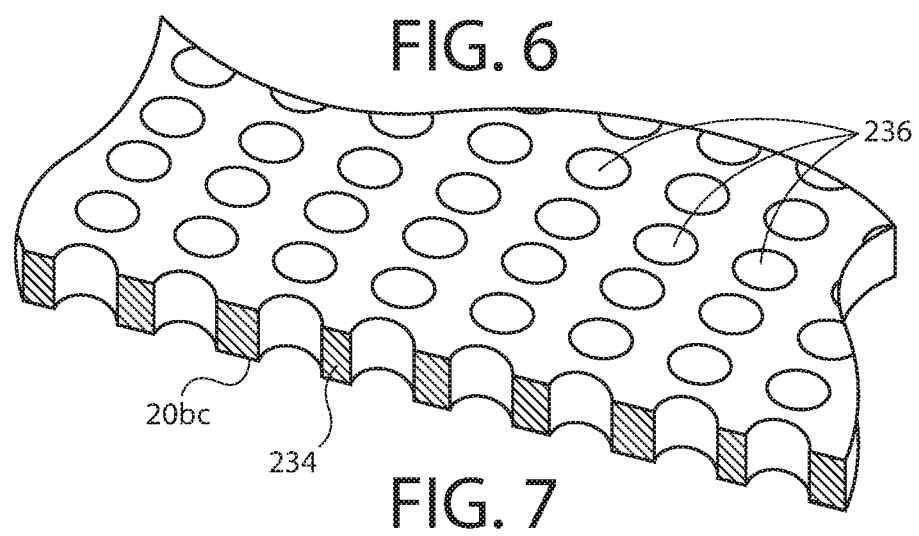
FIG. 7 is an enlarged view of a wavelength specific ray generator of the calibration assembly of FIG. 6.

As noted above, in some embodiments the ray generator 104 may have a blocking substrate that selectively blocks certain wavelengths. Additionally, the spacing layer can be combined with one or more ray generators to generate additional depth layers for the calibration. FIGS. 6 and 7 illustrate a second embodiment of the ray generator and spacing layer. With reference to FIGS. 6 and 7, in this embodiment, a multilayer mask 204 forms the ray generator, the multilayer mask includes multiple wavelength specific ray generators 206a, 206b, 206c and multiple spacing layers 208a, 208b, 208c. In this example, each of the wavelength-specific ray generators 206a 206b, 206b include a substrate 234 that selectively blocks one or more wavelengths, but allows other wavelengths to be transmitted through the substrate. In this configuration, the blocked wavelengths can only be transmitted through the ray apertures 236 defined in the substrate 234.

The wavelength specific ray generators 206a, 206b, 206c are selected to block different wavelengths. For example, the first ray generator 206a can be yellow and block blue light wavelengths 212a 212b; the second ray generator 206b can be magenta and block green light wavelengths 214a, 214b; and the third ray generator 206c can be cyan and block red light wavelengths 216a, 216b. In this example, the blue light wavelengths 212a, 212b can be transmitted only through the ray apertures 236 in the first ray generator 206a, but will pass through the substrates 234 of the other optical filters 206b, 206c (as well as any ray apertures in those substrates). As shown in FIG. 7, this structure results in additional rays that are generated at different depths, depending on the location of the specific light wavelength ray generator 206a, 206b, 206c. Other types of filter and color combinations can be used as well. Further, rather than using color (or in addition to color), additional ray generators may filter based on polarization, e.g., polarized blocking. It should be noted that although three wavelength ray generators are shown, fewer or more may be used. Additionally, although the ray generators are shown stacked in alignment, they may be offset from one another and/or used individually and the results combined together for the calibration.

With reference to FIG. 6, in this embodiment, the multilayer mask 204 also includes multiple spacing layers 208a, 208b, 208c. The spacing layers 208a, 208b, 208c are similar to the spacing layer 130 and are used to set a predetermined distance for the respective wavelength specific ray generator 206a, 206b, 206c from the emitting device 103. The spacing layers 208a, 208b, 208c allow the wavelength specific masks, which may be positioned on top of or integrated with the spacing layer, to be positioned at different depths from the emitting device 103, which adds an additional depth component that increases accuracy with the calibration system 100.

The multilayer mask 204 generates a different perceived light volume that can be captured by the optical device 106.

Figure 8:
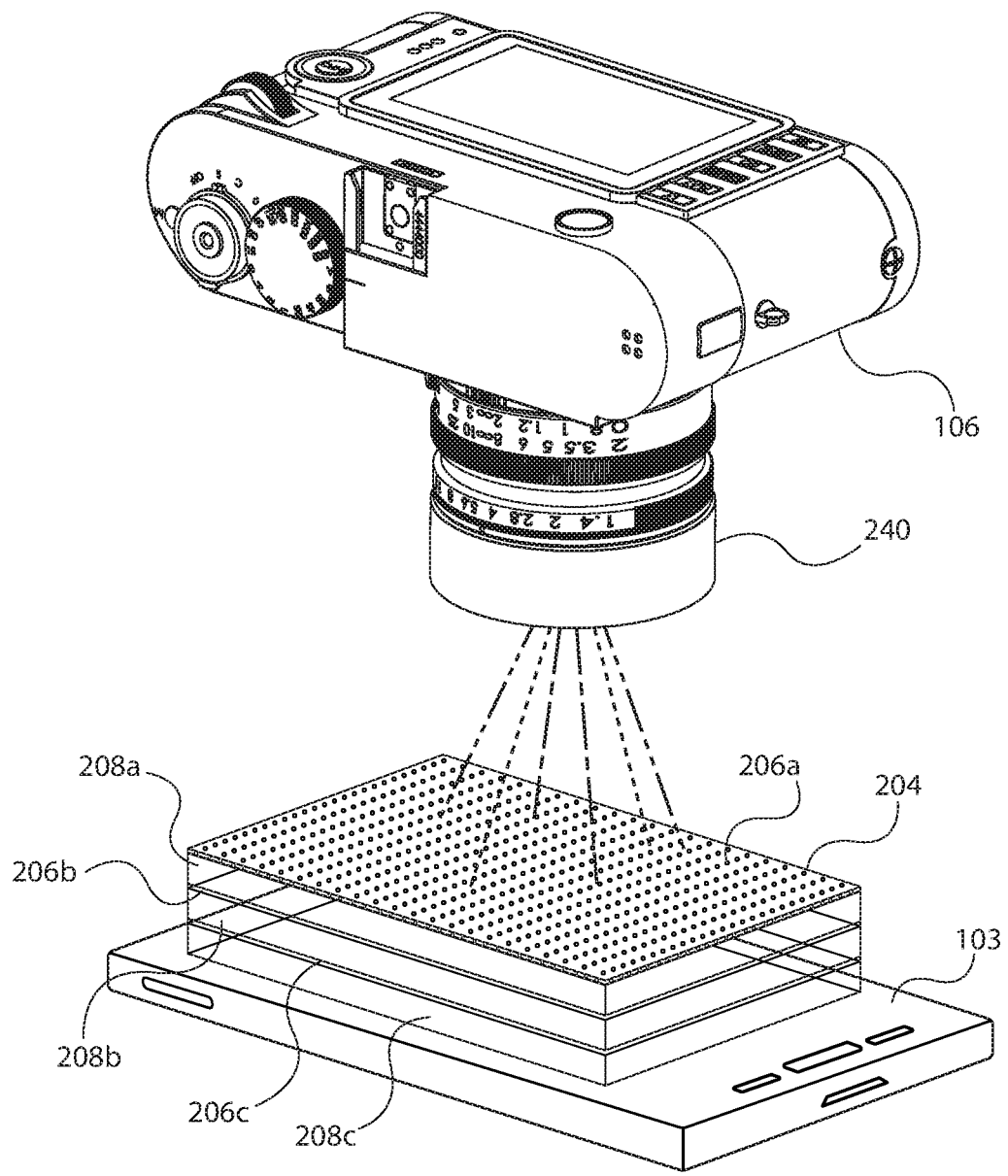
FIG. 8 is an isometric view of the calibration assembly of FIG. 6 aligned with an optical device for calibration.

FIG. 8 illustrates the calibration example of FIG. 6 ready for use to calibrate the optical device 106. With reference to FIG. 8, the multilayer ray generator 204 is assembled such that the various wavelength specific ray generators 206a, 206b, 206b are positioned on top of their respective spacing layers 208a, 208b, 208c, which are in turn positioned on top of the emitting device 103 and the light-generating region. The optical device 106 is then aligned with the multilayer ray generator 204 and the emitting device 103 and captures images of the light rays that are generated by the emitting device 103 and that extend through the ray generator 204.

Figure 9:
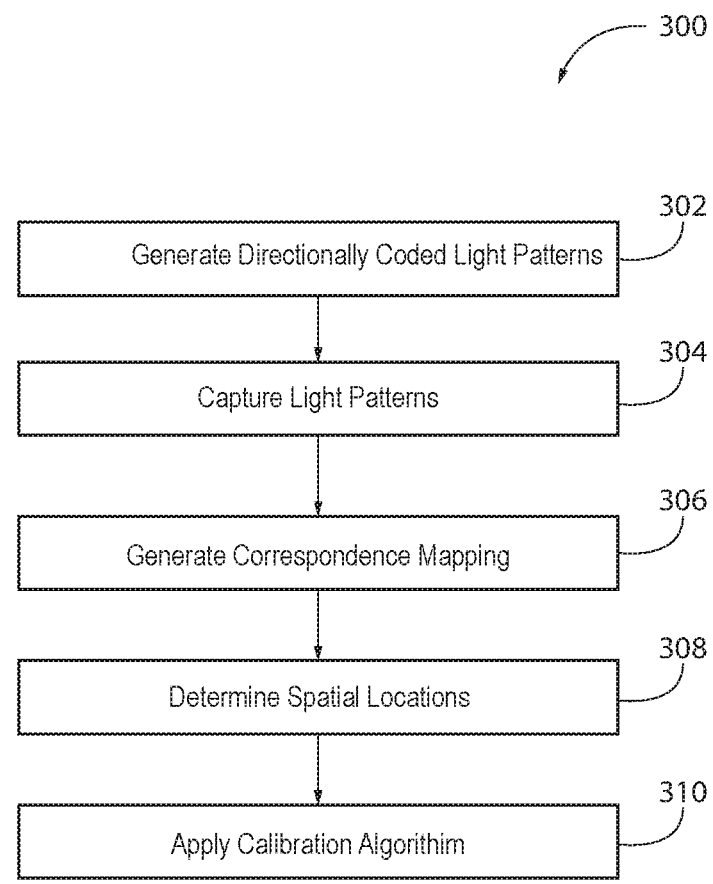
FIG. 9 is a flow chart illustrating a method for calibrating an optical device using the calibration system of FIG. 1.

FIG. 9 is a flow chart illustrating a method 300 for using the calibration system 100 to calibrate the optical device 106. With reference to FIGS. 1, 8, and 9, the method 300 begins with operation 302 and structured light patterns are created. To generate the structured light patterns, the light-emitting device 103 is activated and given specific light patterns to emit. For example, binary structured light patterns such as dense binary structured light patterns, or other emitted light that can represent or describe virtual points in space. The light patterns can be random, predetermined, or a combination. The light patterns can be selected such that they describe a specific point, random points, or the like. The ray generator 104, 204 generates directional rays from the structured light patterns. The directional rays are angled light rays that replicate the type of wavelengths that could be generated by an object positioned at different locations relative to the optical device 106. For example, a device that can generate rays of light that ca be tuned/adjusted to describe points that are at various depths. The rays can represent one point, random points, predetermined points, or the like that may represent an object positioned at various locations from the optical device. In embodiments where the ray generator 104, 204 is an active mask, the different directional rays may be generated at different stages where the ray generator 104 varies characteristics of the ray apertures between or during each projected light pattern.

Once the light patterns and directional rays have been generated, the method 300 proceeds to operation 304 and the optical device 106 captures images of the light patterns. After the images are captured, the method 300 proceeds to operation 306 and the computer 102 generates correspondences between the ray generator 104, 204, the emitting device 103, and an image plane of the optical device 106. For example, the computer 102, and specifically, the processor element 108, determines a center of projections on the image plane of the optical device 106, as well as removes any outliers. In short, this operation is directed to assessing the center ray and can use detection algorithms or center of gravity algorithms to determine the center ray. The device hardware, the lens hardware, the captured images, the aperture blocking effect of the lens can all be analyzed to detect the center directional ray.

Once the correspondence mapping is complete, the method 300 proceeds to operation 308 and the processing element 108 determines the spatial locations of the light rays are determined. For example, the processing element 108 uses the ray aperture 136, 236 spacing (which is known), along with the size of the light-emitting region of the emitting device 103, along with the spacing distance of the spacing layers 130 (if any) to determine the translation and rotation of the ray generators 104, 204 by searching for rays that intersect as close as possible to a single point.

Using the correspondences and the spatial locations, the method 300 proceeds to operation 310 and the optical device 106 is calibrated. In particular, one or more calibration algorithm can be used to calibrate the optical device 106. In a first example, the locations of the ray apertures 136, 236 with respect to the emitting device 103 are known and the two-dimensional (2D) correspondences can be described as three-dimensional locations (3D) and a standard 2D to 3D calibration method, such as direct linear transform (DLT) is used to determine the lens properties and optical device characteristics. It should be noted that operations 308 and 310 can be done simultaneously and the calibration algorithm and the spatial locations will be determined during the same process.

In a second example, a calibration method such as direct usage of the generated rays is used to estimate the lens properties of the optical device 106.

In either example, optionally outlier tolerant and optimization methods can be used to minimize the rear-projection error further. In short, substantially any calibration technique can be used as the relationship between the rays captured or visible by the optical device 106 can be compared with the known directional rays that are transmitted to the optical device 106 is known. This relationship illustrates the behavior of the lens of the optical device 106, as well as inherent characteristics of the device itself. In other words, the mapping of pixel positions as captured by the optical device. In other words, the calibration assembly generates light rays that replicate 3D positions.

Figure 10:
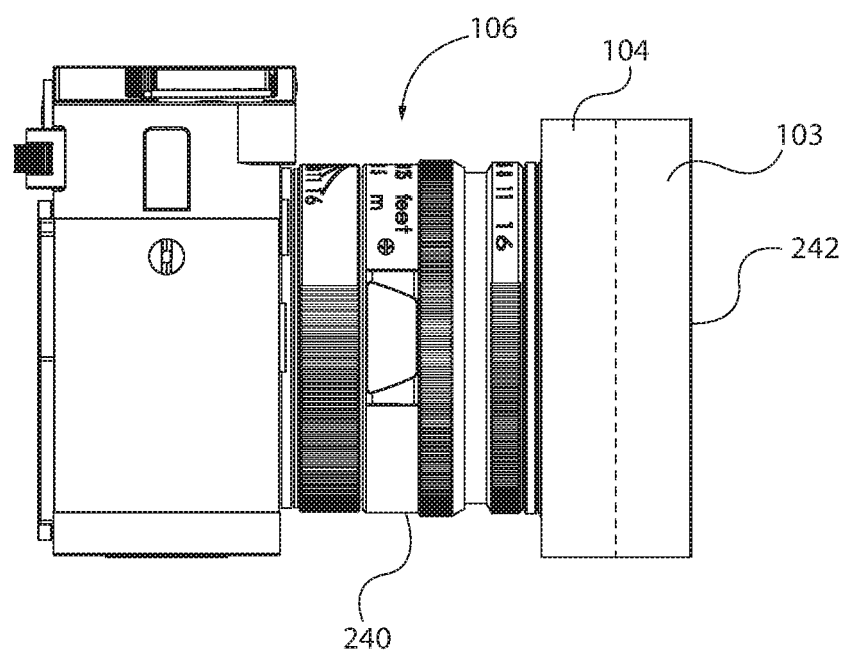
FIG. 10 is a side elevation view of the calibration assembly integrated into an attachable module that connects directly to the optical device.

FIG. 10 illustrates a side elevation view of the calibration assembly 103, 104 integrated into an attachment or accessory for the optical device 106. With reference to FIG. 10, the calibration assembly 242 is an integrated device including the emitting device 103 and the ray generator 104 connected together. The calibration assembly 242 can then be attached directly to a lens 240 of the optical device 106. In this example, the calibration assembly 242 can be screwed on or snap-fit onto the outer end of the lens 240 similar to the attachment of a lens cap, additional lens, or the like. In this embodiment, the user error risk can be substantially reduced as the calibration setup can be ensured to be accurate.

The calibration system 100 and method 300 is highly repeatable as it is easy for a user to set up, can be integrated into an accessory of the optical device 106 (such as a lens cap or the like), and can be completed in a small space. The method allows calibration of out of focus areas, as well as in-focus areas, and enables a small calibration design that can be mounted directly to the optical device. Additionally, the calibration system and method help to un-distort images, enable accurate projector calibration methods that require a calibrated camera for projection mapping applications, as well as enhance sensitivity and accuracy in motion tracking, image stitching, and 3D reconstruction.

The above specifications, examples, and data provide a complete description of the structure and use of exemplary embodiments of the invention as defined in the claims. Although various embodiments of the disclosure have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as only illustrative of particular embodiments and not limiting. Changes in detail or structure may be made without departing from the basic elements of the invention as defined in the following claims.

What is claimed is:
1. A system for calibrating an optical device comprising:
a light emitting device that generates one or more structured light patterns;
a light ray generator in optical communication with the light emitting device for generating directional light rays from the one or more structured light patterns, wherein the light ray generator is in optical communication with the optical device; and
a computer in electronic communication with the optical device; wherein
the ray generator separates light of the one or more structured light patterns emitted from the light emitting device to generate a plurality of directional light rays, the directional light rays representing points at different depths; and an image of the directional light rays corresponding to the one or more structured light patterns are captured by the optical device; and the computer determines one or more lens properties of the optical device for one or more calibration settings based on the image of the directional light rays representing points at different depths corresponding to the one or more structured light patterns captured by the optical device.

2. The system of claim 1, wherein the ray generator is a holographic display that encodes information as a function of both spatial position and angular direction.

3. The system of claim 1, wherein the ray generator comprises a plurality of ray apertures.

4. The system of claim 3, wherein the ray apertures are dynamically generated.

5. The system of claim 4, wherein the ray generator comprises an active spatial light modulator.

6. The system of claim 5, wherein the ray generator comprises a liquid crystal display.

7. The system of claim 1, wherein the computer analyzes the generated directional rays and the one or more structured light patterns as compared to the directional rays captured by the optical device to determine the one or more lens properties and to determine the one or more calibration settings for the optical device, wherein the structured light patterns represent virtual points in space.

8. The system of claim 1, wherein the ray generator comprises:
   a first wavelength mask;
   a second wavelength mask; and
   a third wavelength mask.

9. The system of claim 8, wherein the first color mask, the second color mask, and the third color mask are arranged at different distances from the light-generating device.

10. The system of claim 1, wherein the light-emitting device is an electronic display screen.

11. The system of claim 1, further comprising a spacing layer positioned between the light-emitting device and the ray generator, wherein the spacing layer is transparent and light from the structured light patterns is transmitted through the spacing layer to reach the ray generator.

12. A method for calibrating an optical device comprising:
   generating by a light-generating device, a structured light calibration pattern;
   separating by a ray generator the structured light calibration pattern into a plurality of directional light rays, the directional light rays representing points at different depths;
   capturing one or more images by the optical device of the plurality of directional light rays representing points at different depths; and
   determining by a processing element one or more lens properties of the optical device for one or more calibration settings based on the directional light ray images captured by the optical device.

13. The method of claim 12, wherein the ray generator comprises a plurality of ray apertures that segment the structured light calibration pattern into the plurality of directional light rays.

14. The method of claim 12, further comprising generating by the processing element a mapping between the plurality of directional light rays and the structured light calibration pattern as generated by the light-generating device.

15. The method of claim 14, wherein
   the light-generating device is an electronic display; and
   the optical device is a camera, and the camera captures light directly from the light-generating device.

16. The method of claim 12, wherein the ray generator comprises two or more wavelength specific ray generators having a blocking substrate that allows selective wavelengths to pass therethrough.

17. The method of claim 12, wherein the ray generator is active.

18. A calibration assembly for use in calibrating a camera, comprising:
   an emitting device that generates light wavelengths; and
   an optical mask in optical communication with the emitting device; wherein
   the emitting device generates light wavelengths corresponding to a plurality of structured light calibration patterns;
   the optical mask separates the light wavelengths of the plurality of structured light calibration patterns emitted from the emitting device into one or more directional light rays, wherein the directional light rays represent points at different depths and are captured by the camera to be calibrated; and
   a processing element in electronic communication with the camera and the emitting device, wherein the processing element determines one or more calibration settings for the camera based on the directional light rays captured by the camera and the plurality of structured light calibration patterns.

19. The calibration assembly of claim 18, wherein the optical mask is passive and includes a plurality of predefined ray apertures that separate the light wavelengths into the one or more directional light rays.

20. The calibration assembly of claim 18, wherein the optical mask is active and includes a plurality of pixels that are selectively modified to transmit or block the light wavelengths to generate the one or more directional light rays.

* * * * *